(12) United States Patent
Teraguchi

(10) Patent No.: US 11,875,588 B2
(45) Date of Patent: Jan. 16, 2024

(54) DOCUMENT PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Kiyoshi Teraguchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 507 days.

(21) Appl. No.: 16/908,714

(22) Filed: Jun. 22, 2020

(65) Prior Publication Data

US 2021/0240977 A1   Aug. 5, 2021

(30) Foreign Application Priority Data

Feb. 3, 2020   (JP) ................................. 2020-016610

(51) Int. Cl.
*G06V 30/414*   (2022.01)
*G06F 16/93*   (2019.01)
*G06V 30/416*   (2022.01)
*G06V 30/418*   (2022.01)

(52) U.S. Cl.
CPC ............ *G06V 30/414* (2022.01); *G06F 16/93* (2019.01); *G06V 30/416* (2022.01); *G06V 30/418* (2022.01)

(58) Field of Classification Search
CPC .. G06V 30/414; G06V 30/416; G06V 30/418; G06V 30/40; G06V 10/751; G06F 16/93
USPC ....................................................... 382/112
See application file for complete search history.

(56) References Cited

U.S. PATENT DOCUMENTS

| | | | | | |
|---|---|---|---|---|---|
| 6,064,769 | A | * | 5/2000 | Nakao | G06V 30/414 382/209 |
| 6,104,833 | A | * | 8/2000 | Naoi | G06V 30/414 382/187 |
| 6,137,905 | A | * | 10/2000 | Takaoka | G06V 30/1463 382/175 |
| 6,163,623 | A | * | 12/2000 | Ohta | G06V 30/40 382/176 |
| 6,188,790 | B1 | * | 2/2001 | Yoshikawa | G06V 30/166 382/177 |

(Continued)

FOREIGN PATENT DOCUMENTS

| | | | | |
|---|---|---|---|---|
| CN | 100422990 C | * | 10/2008 | ........... G06K 9/2054 |
| EP | 1146478 A2 | * | 10/2001 | ......... G06K 9/00469 |

(Continued)

OTHER PUBLICATIONS

"Notice of Reasons for Refusal of Japan Counterpart Application", dated Nov. 14, 2023, with English translation thereof, p. 1-p. 8.

*Primary Examiner* — Mahendra R Patel
(74) *Attorney, Agent, or Firm* — JCIPRNET

(57) ABSTRACT

A document processing apparatus includes a processor configured to extract an image area, in which an image is disposed, from a plurality of documents to be processed, perform an image recognition process on the image area, compare information on the image of the image area for each document, the information being obtained by performing the image recognition process, and decide a difference for the documents based on a result of comparison of the information on the image and a decision rule for the documents.

10 Claims, 14 Drawing Sheets

(56) References Cited

U.S. PATENT DOCUMENTS

| | | | | |
|---|---|---|---|---|
| 6,289,120 B1* | 9/2001 | Yamaai | ............ | G06V 30/1444 |
| | | | | 382/173 |
| 7,031,553 B2* | 4/2006 | Myers | ............ | G06V 20/63 |
| | | | | 382/290 |
| 8,996,350 B1* | 3/2015 | Dub | ............ | G06F 16/24578 |
| | | | | 707/673 |
| 9,514,103 B2* | 12/2016 | Kletter | ............ | G06F 40/166 |
| 9,772,805 B2 | 9/2017 | Matsumoto | | |
| 9,778,823 B2* | 10/2017 | Yoshizaki | ............ | G06F 3/0483 |
| 9,996,741 B2* | 6/2018 | Amtrup | ............ | G06F 18/2411 |
| 10,140,294 B2* | 11/2018 | Millefiorini | ............ | G06Q 10/10 |
| 2001/0014176 A1* | 8/2001 | Kamada | ............ | G06V 10/987 |
| | | | | 382/181 |
| 2002/0006220 A1* | 1/2002 | Kohchi | ............ | G06V 30/413 |
| | | | | 382/165 |
| 2002/0029232 A1* | 3/2002 | Bobrow | ............ | G06V 30/418 |
| | | | | 514/534 |
| 2007/0036468 A1* | 2/2007 | Matsushita | ............ | G06F 16/93 |
| | | | | 707/E17.02 |
| 2008/0147790 A1* | 6/2008 | Malaney | ............ | G06Q 10/00 |
| | | | | 709/203 |
| 2011/0097002 A1* | 4/2011 | Ishiguro | ............ | G06V 30/158 |
| | | | | 382/229 |

FOREIGN PATENT DOCUMENTS

| | | | | | |
|---|---|---|---|---|---|
| JP | 2004201240 A | * | 7/2004 | ............ | G06K 9/4604 |
| JP | 3743494 B2 | * | 2/2006 | ............ | G06K 9/4652 |
| JP | 4071328 B2 | * | 4/2008 | ............ | G06K 9/00 |
| JP | 4227432 B2 | * | 2/2009 | ............ | G06K 9/4652 |
| JP | 4633773 B2 | * | 2/2011 | ............ | G06K 9/00456 |
| JP | 2014002629 | | 1/2014 | | |
| JP | 2015132885 | | 7/2015 | | |
| JP | 2015132885 A | * | 7/2015 | ............ | G06F 17/217 |
| JP | 2016024528 | | 2/2016 | | |

* cited by examiner

TARGET DOCUMENT

TITLE

DESCRIPTION OF DRAWING
CLOUD, PERSON,
AND BUILDING ARE CAPTURED.

COMPARATIVE DOCUMENT 1

TITLE

Figure 1:
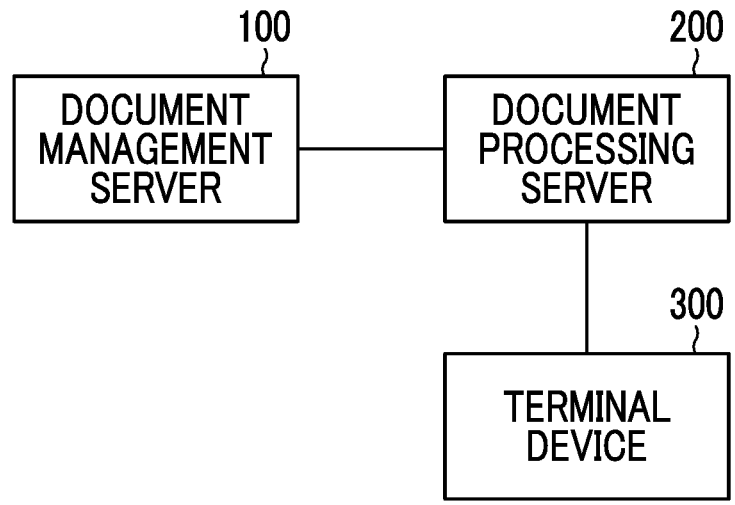

DESCRIPTION OF DRAWING
CLOUD, PERSON,
AND BUILDING ARE
CAPTURED.

COMPARATIVE DOCUMENT 2

TITLE

DESCRIPTION OF DRAWING
CLOUD, PERSON,
AND BUILDING ARE CAPTURED.

COMPARATIVE DOCUMENT 3

TITLE

DESCRIPTION OF DRAWING
CLOUD AND BUILDING
ARE CAPTURED.

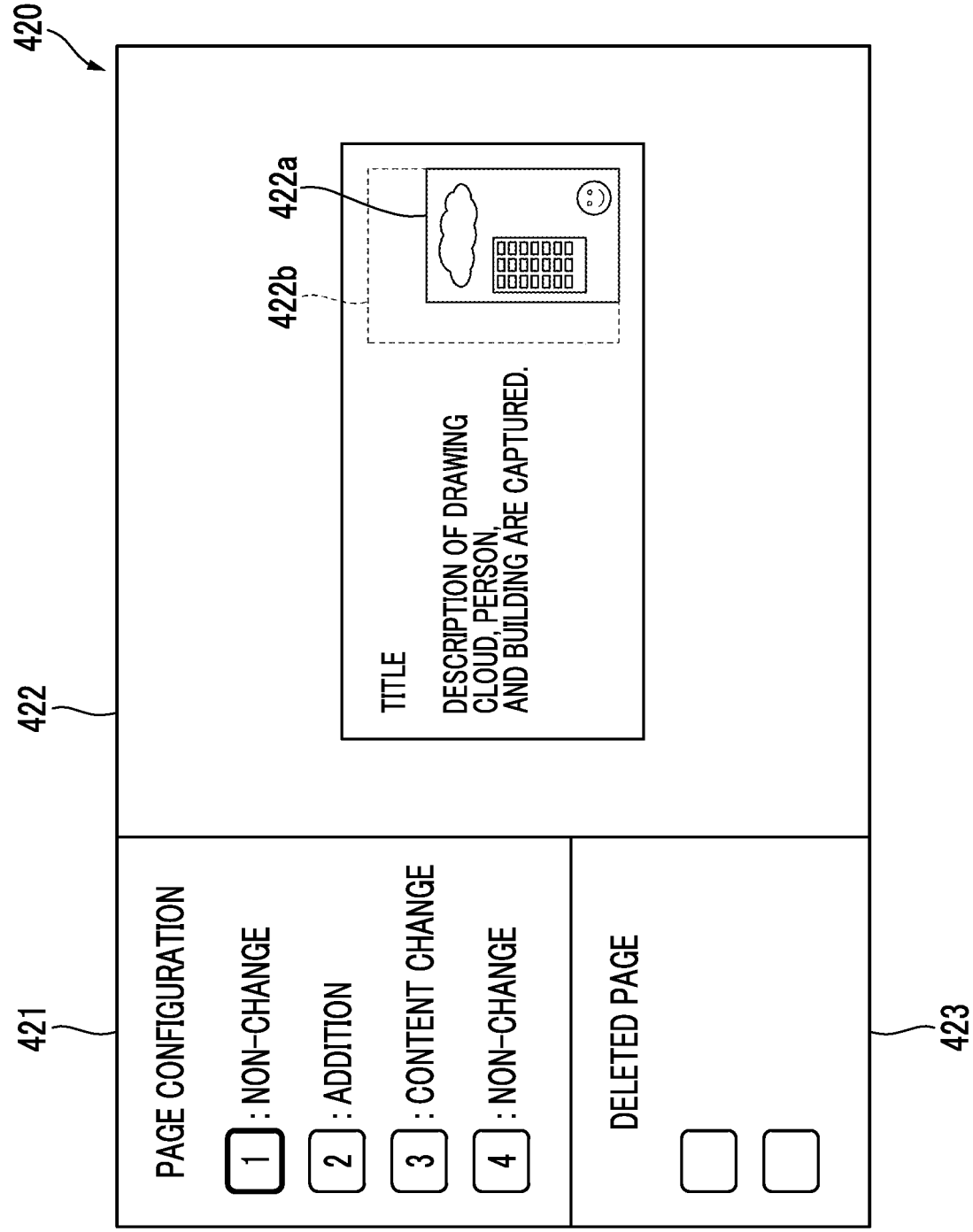

FIG. 15

| DOCUMENT NAME | PAGE NUMBER | POSITIONAL INFORMATION | AREA TYPE | AREA CONTENT |
|---|---|---|---|---|
| SAMPLE.ppt | 1 | [20, −20, 60, −40] | TEXT | TITLE |
| SAMPLE.ppt | 1 | [20, −60, 90, −80] | TEXT | CLOUD, PERSON, AND BUILDING ARE CAPTURED. |
| SAMPLE.ppt | 1 | [130, −50, 190, −150] | IMAGE | [CLOUD, 10, −10] [BUILDING, 10, −70] [PERSON, 80, −150] |
| SAMPLE.ppt | 2 | [20, −20, 60, −40] | TEXT | TITLE |
| SAMPLE.ppt | 2 | [20, −60, 90, −80] | TEXT | CLOUD, PERSON, AND BUILDING ARE CAPTURED. |
| SAMPLE.ppt | 2 | [100, −20, 190, −150] | IMAGE | [CLOUD, 10, −10] [BUILDING, 10, −70] [PERSON, 80, −150] |
| SAMPLE.ppt | 3 | [20, −20, 60, −40] | TEXT | TITLE |
| SAMPLE.ppt | 3 | [20, −60, 90, −80] | TEXT | CLOUD, PERSON, AND BUILDING ARE CAPTURED. |
| SAMPLE.ppt | 3 | [130, −50, 190, −150] | IMAGE | [CLOUD, 10, −10] [BUILDING, 50, −50] |

DOCUMENT PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-016610 filed Feb. 3, 2020.

BACKGROUND

(i) Technical Field

The present invention relates to a document processing apparatus and a non-transitory computer readable medium storing a program.

(ii) Related Art

In a case where a document is revised or modified, there is a case where comparison is required to be performed on a plurality of documents to extract a difference.

JP2015-132885A discloses a technology, for two electronic documents having a plurality of pages, of extracting a difference between images for each page by performing conversion on each page into an image and performing comparison on each imaged page.

SUMMARY

In the image comparison, in a case where contents represented by images in documents are identical but positions or sizes of the images are changed or positions or sizes of objects in the images are changed, a difference between the images is detected, and thus there is a case where difference decision is erroneously performed on the documents.

Aspects of non-limiting embodiments of the present disclosure relate to a document processing apparatus and a non-transitory computer readable medium storing a program that, in comparison between documents including images, enable to perform decision on the difference between the documents including images, based on the content of the document including the images, as compared with the case where the difference decision is performed by simply comparing the images.

Aspects of certain non-limiting exemplary embodiments of the present disclosure overcome the above disadvantages and/or other disadvantages not described above. However, aspects of the non-limiting exemplary embodiments are not required to overcome the disadvantages described above, and aspects of the non-limiting exemplary embodiments of the present disclosure may not overcome any of the disadvantages described above.

According to an aspect of the present disclosure, there is provided a document processing apparatus includes a processor configured to extract an image area, in which an image is disposed, from a plurality of documents to be processed, perform an image recognition process on the image area, compare information on the image of the image area for each document, the information being obtained by performing the image recognition process, and decide a difference for the documents based on a result of comparison of the information on the image and a decision rule for the documents.

BRIEF DESCRIPTION OF THE DRAWINGS

Figure 2:
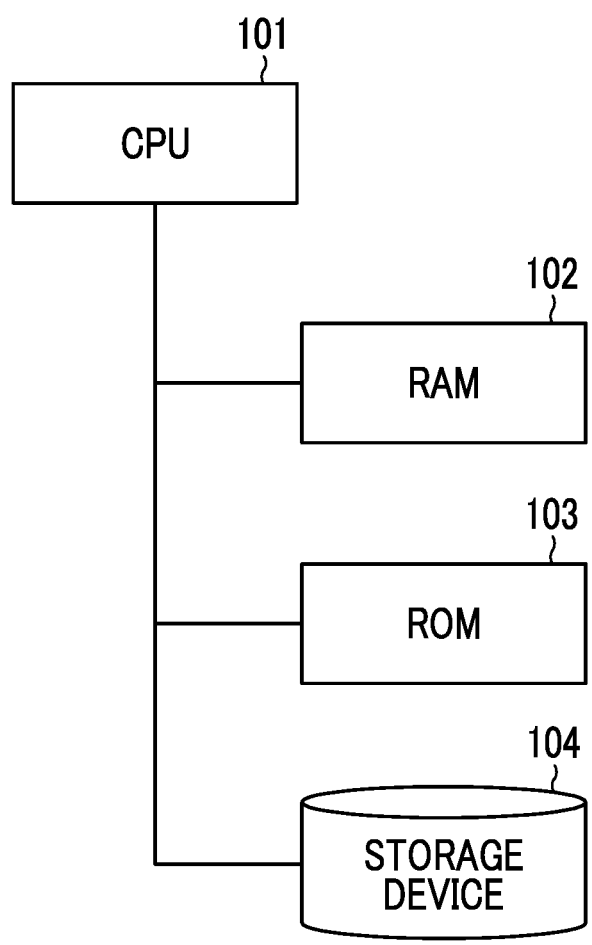
Figure 3:
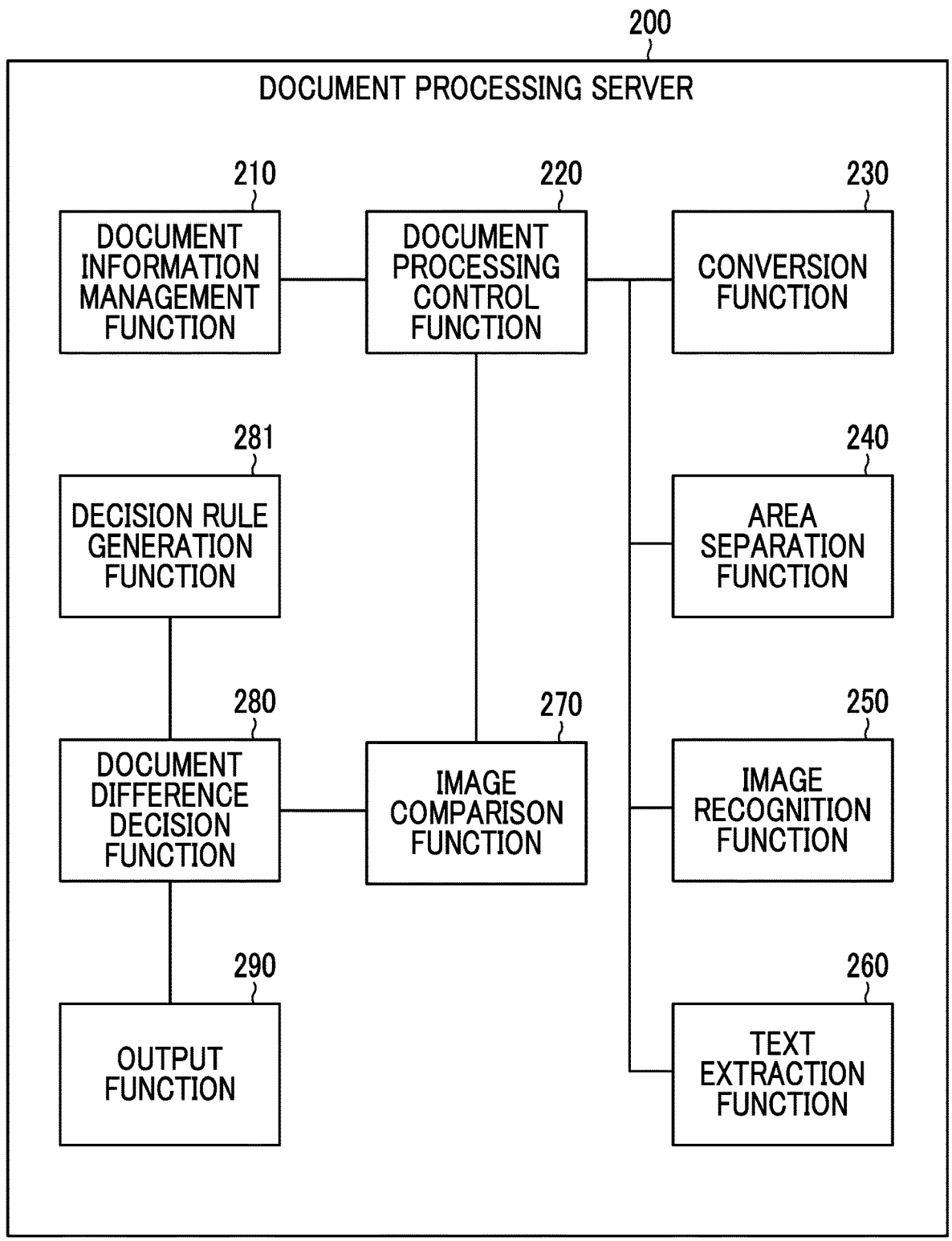
Figure 4:
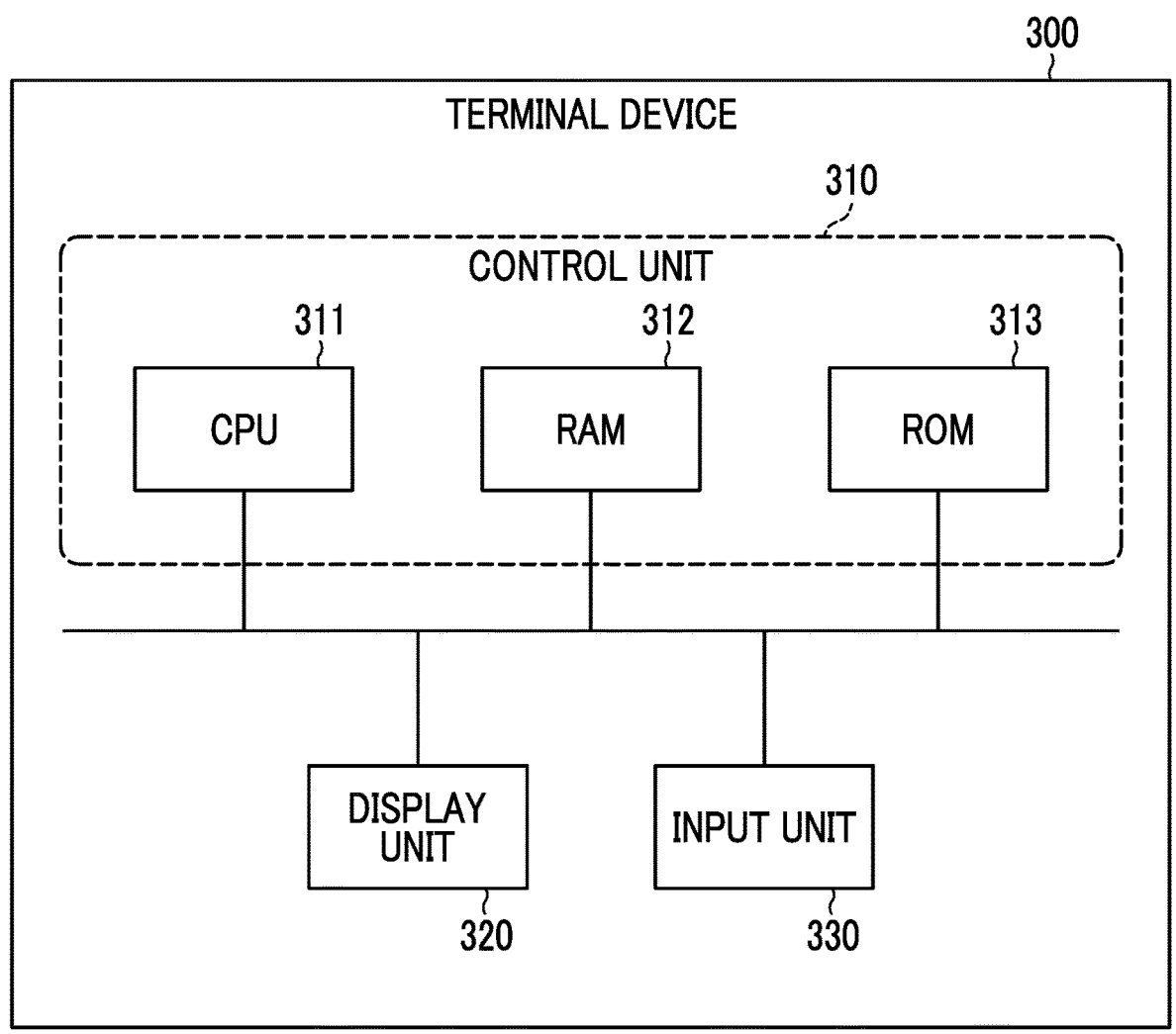
Figure 5:
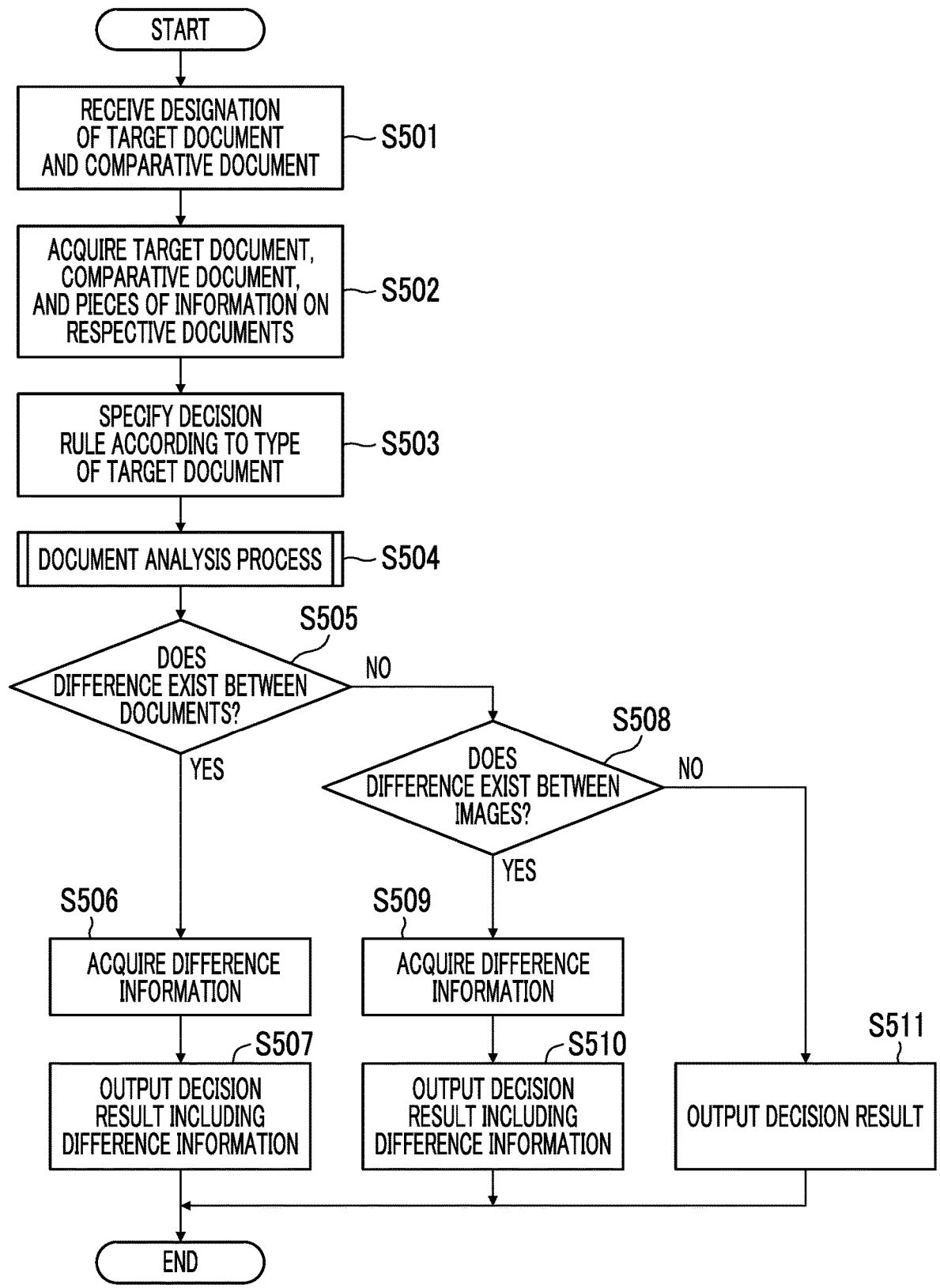
Figure 6:
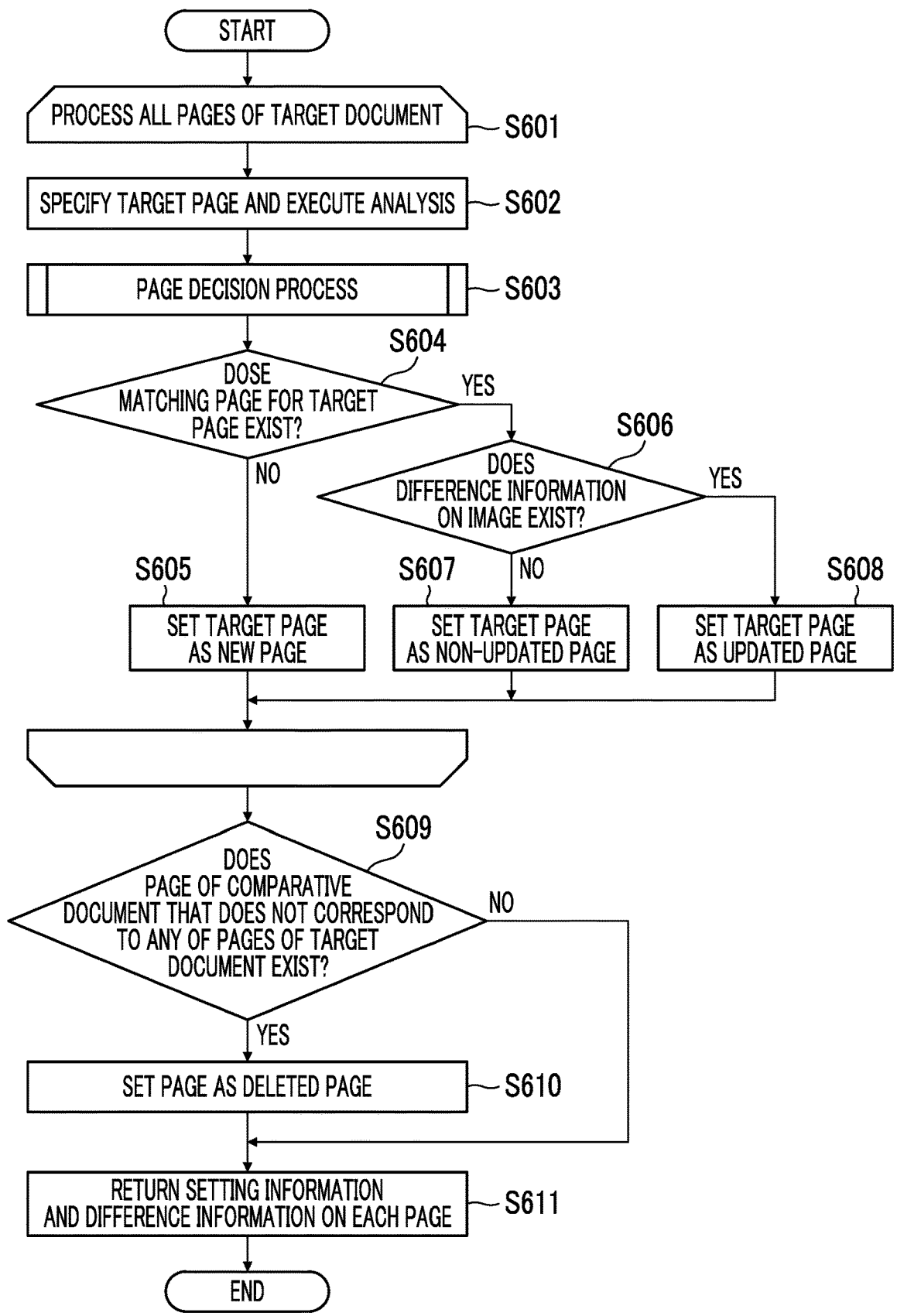
Figure 7:
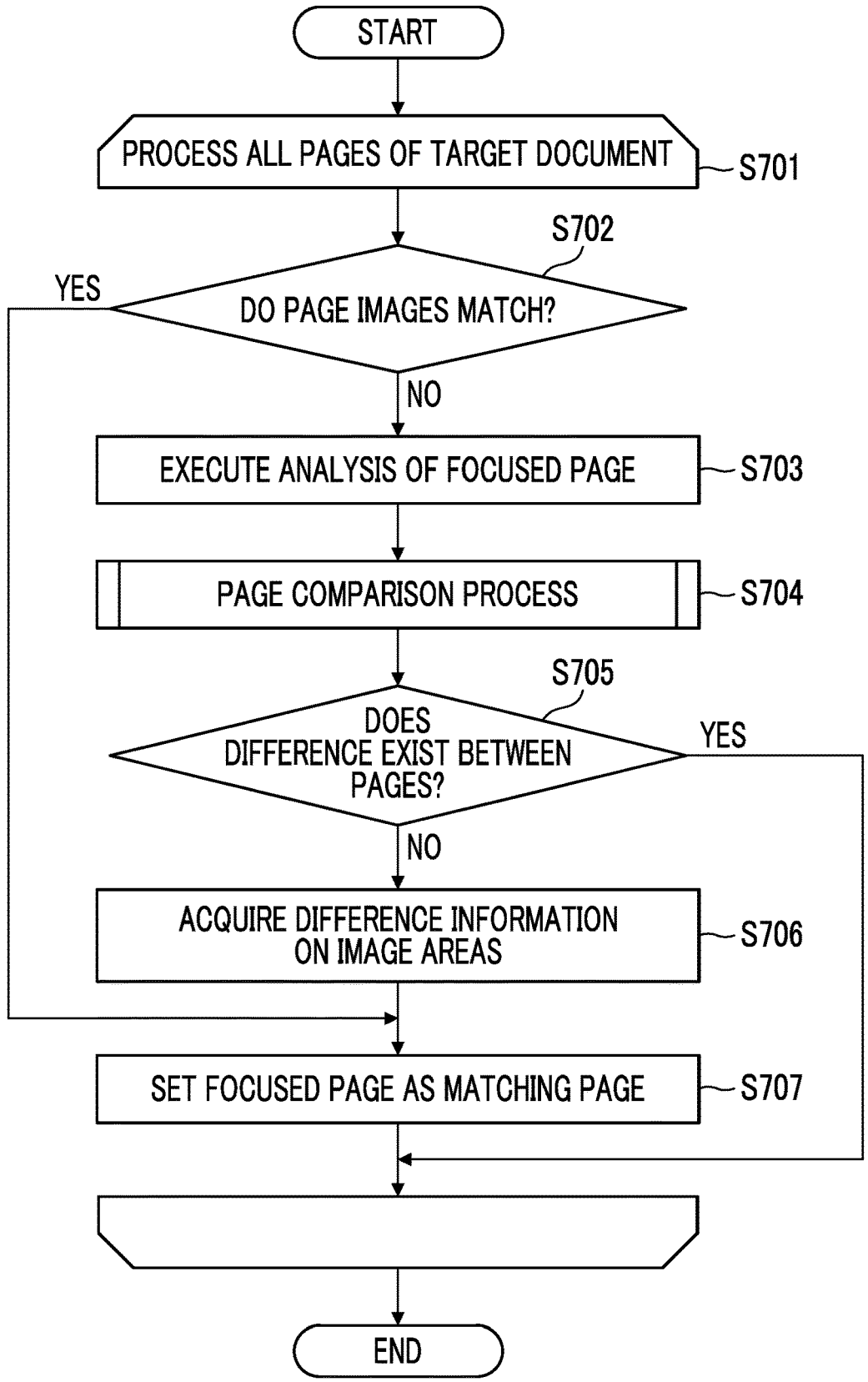
Figure 8:
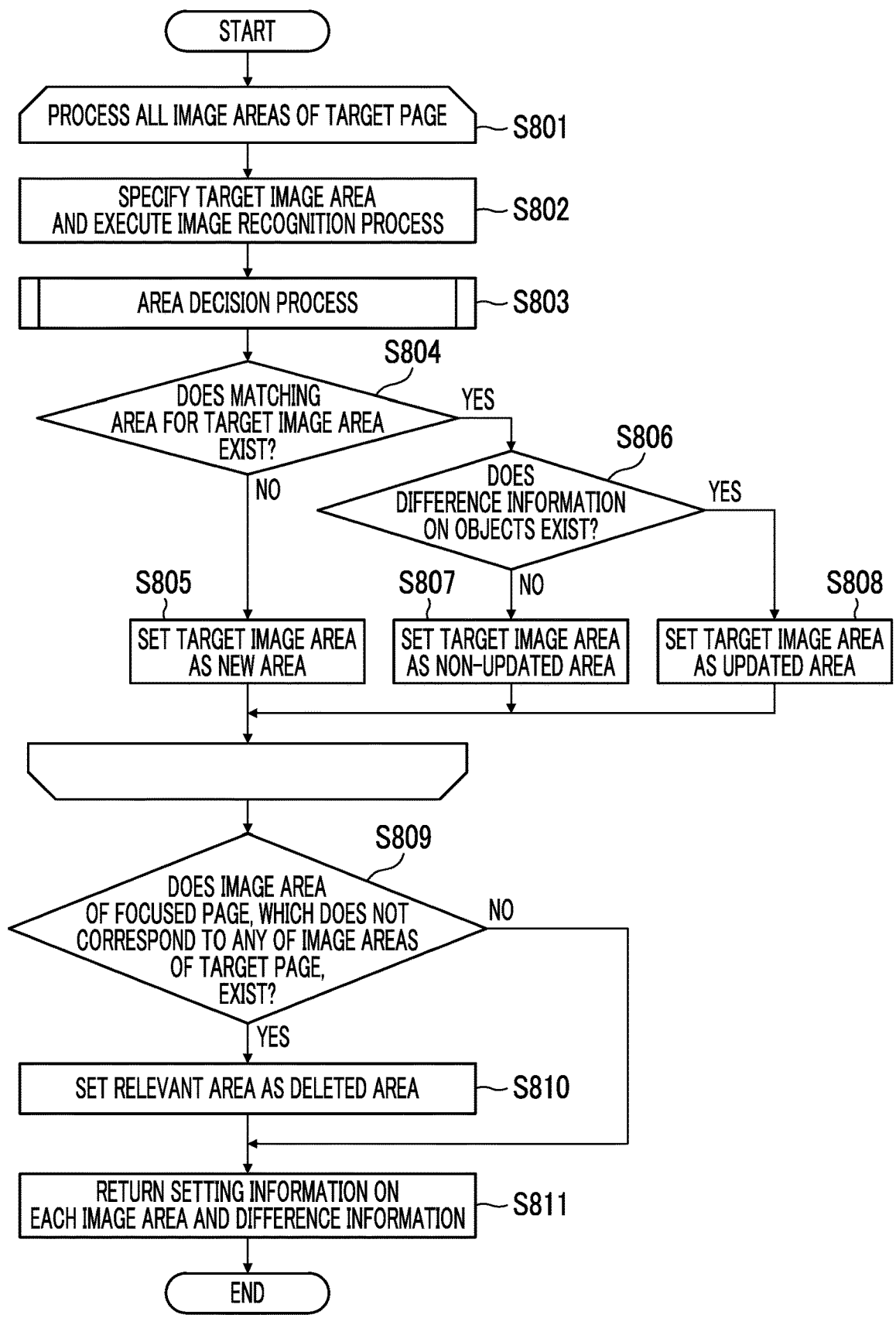
Figure 9:
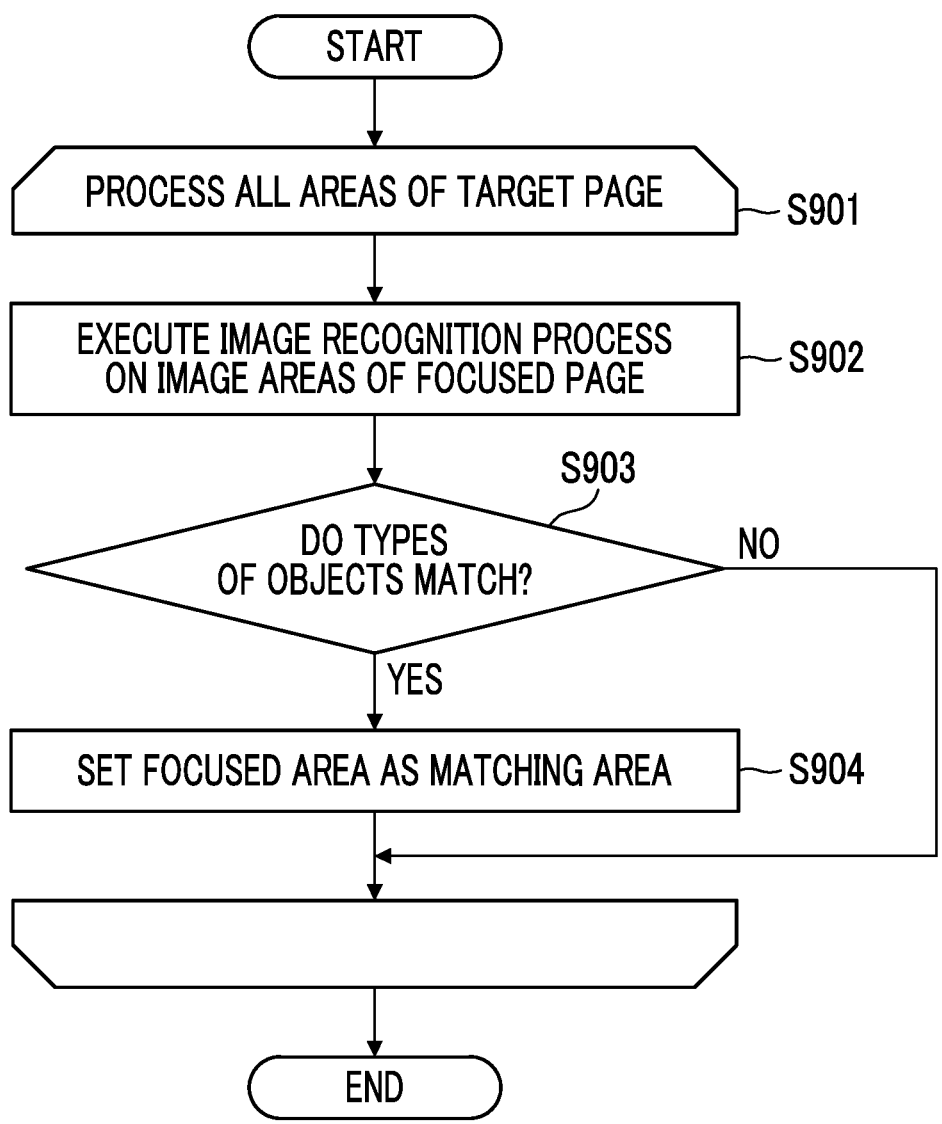
Figure 10:
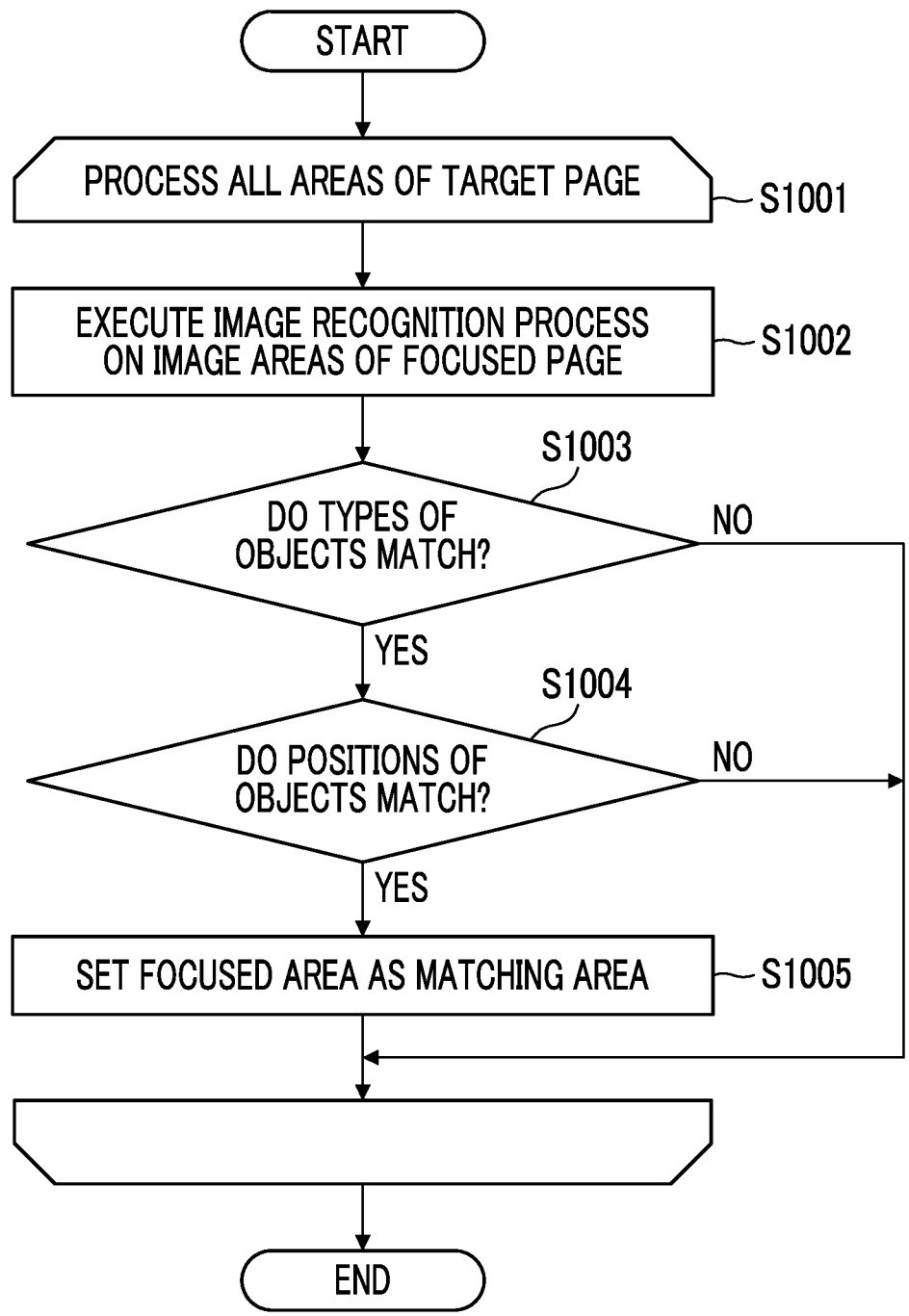
Figure 11:
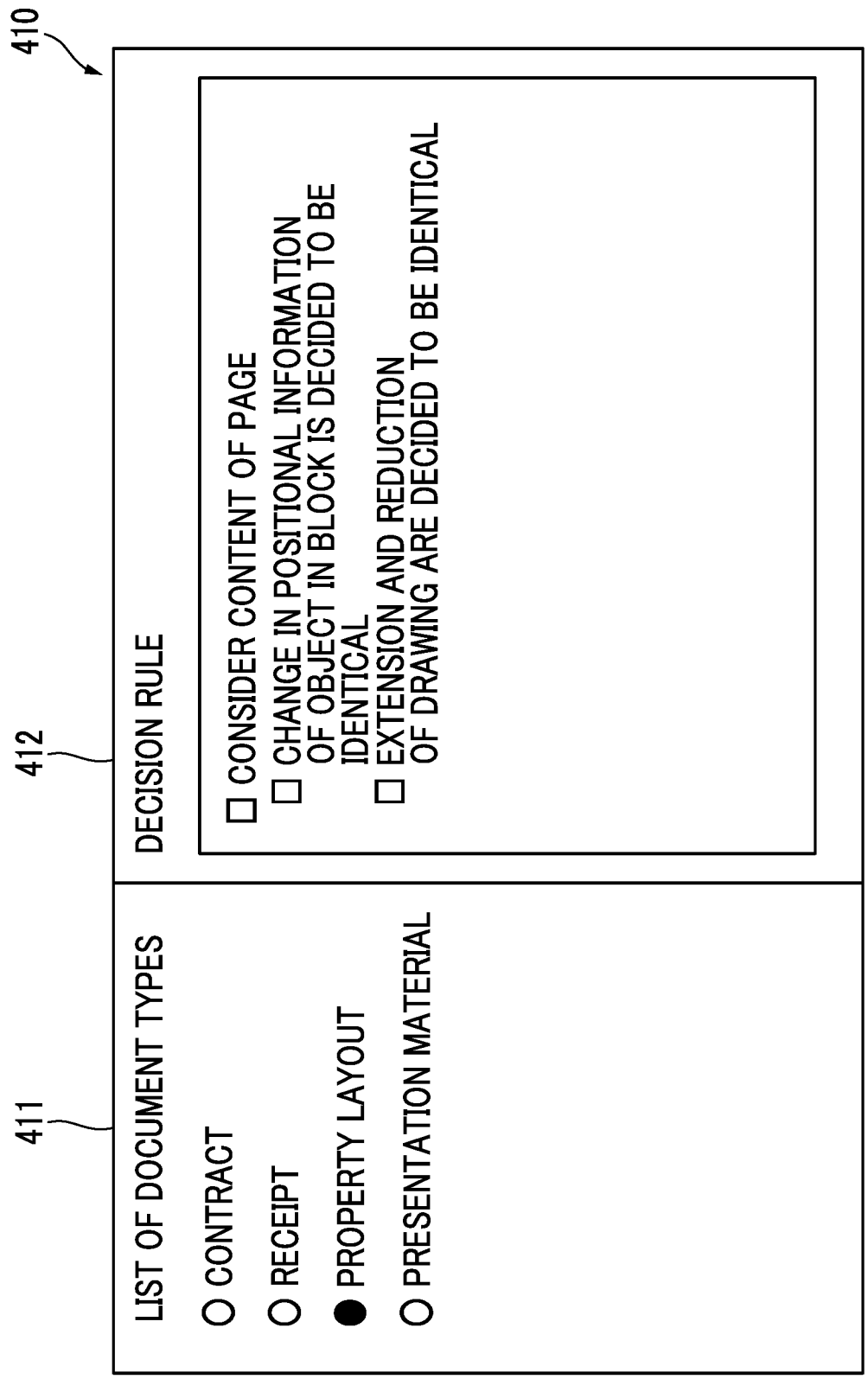
Figure 14:
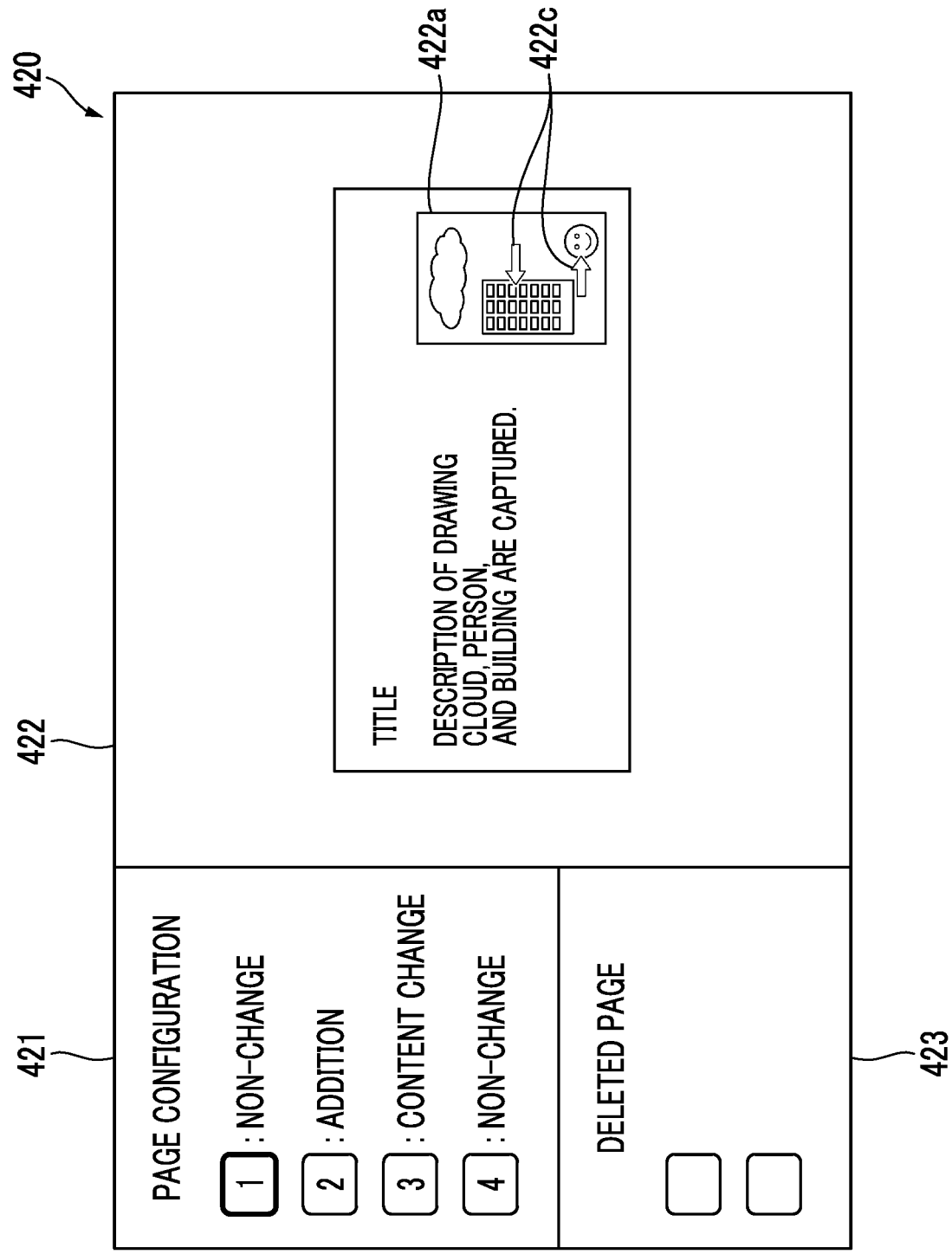

Exemplary embodiment(s) of the present invention will be described in detail based on the following figures, wherein:

FIG. 1 is a diagram showing an overall configuration of an information processing system according to an exemplary embodiment;

FIG. 2 is a diagram showing an example of a hardware configuration of a server;

FIG. 3 is a diagram showing a functional configuration of a document processing server;

FIG. 4 is a diagram showing an example of a configuration of a terminal device;

FIG. 5 is a flowchart showing an operation of the document processing server;

FIG. 6 is a flowchart showing content of a document analysis process shown in FIG. 5;

FIG. 7 is a flowchart showing content of a page decision process shown in FIG. 6;

FIG. 8 is a flowchart showing content of a page comparison process shown in FIG. 7;

FIG. 9 is a flowchart showing content of an area decision process shown in FIG. 8;

FIG. 10 is a flowchart showing another example of the area decision process shown in FIG. 8;

FIG. 11 is a diagram showing an example of a configuration of a decision rule setting screen used for decision of a difference between image areas;

FIGS. 12A to 12D are diagrams showing an example of a target document and comparative documents;

FIG. 13 is a diagram showing a display example of a decision result presentation screen;

FIG. 14 is a diagram showing another display example of the decision result presentation screen; and FIG. 15 is a diagram showing an example of analysis information obtained by the document processing server analyzing page images of the target document and the comparative documents.

DETAILED DESCRIPTION

Hereinafter, an exemplary embodiment of the present invention will be described in detail with reference to the accompanying drawings.

Overall Configuration

FIG. 1 is a diagram showing an overall configuration of an information processing system according to the exemplary embodiment. The information processing system of the exemplary embodiment is realized by including a document management server 100, a document processing server 200, and a terminal device 300.

The document management server 100 is a server that manages and holds a document to be processed. The document processing server 200 is a server that analyzes a plurality of documents and decides differences between the documents. The document management server 100 and the document processing server 200 are servers on a network, and, for example, may be realized as a cloud service or the like on the Internet. In addition, although the document management server 100 and the document processing server 200 are separated servers in the configuration shown in FIG. 1, functions of the document management server 100 and the document processing server 200 maybe configured as a function of a single server. In addition, the document management server 100 and the document processing server 200 may be configured to be distributed by a plurality of servers according to the respective functions. Hereinafter, in a case where the document management server 100 and the document processing server 200 are not distinguished, the document management server 100 and the document processing server 200 are referred to as servers 100 and 200.

The terminal device 300 is a device that is connected to the document management server 100 or the document processing server 200 through the network by an operation of a user, that transmits a request to each of the servers 100 and 200, or that receives information from each of the servers 100 and 200 to output the information. As the terminal device 300, for example, an information processing apparatus, such as a personal computer or a tablet terminal, is used.

Hardware Configuration of Server

FIG. 2 is a diagram showing an example of a hardware configuration of the servers 100 and 200. The servers 100 and 200 are realized by a computer. The computer that realizes the servers 100 and 200 includes a Central Processing Unit (CPU) 101 that is an arithmetic calculator, a Random Access Memory (RAM) 102 that is a memory, a Read Only Memory (ROM) 103, and a storage device 104. The RAM 102 is a main storage device (main memory) and is used as a work memory in a case where the CPU 101 performs an arithmetic process. The ROM 103 holds a program and data, such as a set value that is prepared in advance, and the CPU 101 is capable of directly reading the program and the data from the ROM 103 and executing the process. The storage device 104 is a storage unit of the program and the data. The storage device 104 stores the program, and the CPU 101 reads the program stored in the storage device 104 into the RAM 102, which is the main storage device, and executes the program. In addition, the storage device 104 stores a result of the process performed by the CPU 101. As the storage device 104, for example, a magnetic disk device, a Solid State Drive (SSD), or the like is used.

The document management server 100 realizes functions, such as management of the documents and transmission and reception of the documents to be managed, in such a way that the CPU 101 executes the program. In addition, the documents to be managed are stored in, for example, the storage device 104 described above. In addition, for example, the document processing server 200 realizes various functions of analyzing the documents and deciding the difference in such a way that the CPU 101 executes the program. Hereinafter, each of the functions of the document processing server 200 will be described.

Functional Configuration of Document Processing Server 200

FIG. 3 is a diagram showing a functional configuration of the document processing server 200. The document processing server 200 includes each of functions of a document information management function 210, a document processing control function 220, a conversion function 230, an area separation function 240, an image recognition function 250, a text extraction function 260, an image comparison function 270, a document difference decision function 280, a decision rule generation function 281, and an output function 290.

The document information management function 210 is a function of managing information related to a document which is stored in the document management server 100 and is content to be processed. For example, basic information and information, such as a document type or a storage location, are used as the management information. In addition, in a case where an image recognition process, which will be described later, for each page is performed on the document to be processed, the document information management function 210 manages information on a processing result.

The document processing control function 220 is a function of specifying and acquiring the document to be processed stored in the document management server 100 based on the information managed by the document information management function 210. In the exemplary embodiment, decision of differences between the plurality of documents is performed, and thus the acquired documents to be processed includes one reference document (hereinafter, referred to as a "target document") and one or more documents to be compared (hereinafter, referred to as "comparative documents"). In addition, the document processing control function 220 calls the conversion function 230, the area separation function 240, the image recognition function 250, and the text extraction function 260 for document processing, and executes the processing.

The conversion function 230 is a function of performing division into the target document to be processed and the comparative documents for each page, and converting each page into an image. Therefore, each document to be processed become a set of images for each page.

The area separation function 240 is a function of, for each page of each document to be processed, separating the image of the page obtained through the conversion performed by the conversion function 230 into a block area in which a text is displayed (hereinafter, referred to as a "text area") and a block area in which an image is displayed (hereinafter, referred to as an "image area").

The image recognition function 250 is a function of performing the image recognition process on the image for each page, which is obtained through the conversion performed by the conversion function 230, of each document and the image area of each page separated by the area separation function 240. In addition, the image recognition function 250 is a function of extracting a type and positional information on an image object (hereinafter, simply expressed as an object) displayed in each image area through the image recognition process.

The text extraction function 260 is a function of analyzing the text area of each page separated by the area separation function 240 and extracting the text displayed in each text area and positional information on the text. For example, an existing Optical Character Recognition (OCR) process may be used to extract the text displayed in the text area.

The image comparison function 270 is a function of comparing images of corresponding pages of the target document and the comparative document. In addition, the image comparison function 270 is a function of comparing images of corresponding image areas of the corresponding pages of the target document and the comparative document. In order to specify the corresponding image areas, additional text attached to the image areas may be used. The additional text is text for titles or description of the images. For example, text, such as "o-th figure" or "oo chart", is included. For example, the additional text is obtained using a unit which reads the text from the text area adjacent to the image area by the text extraction function 260.

The image comparison function 270 is a function of first determining whether or not the images of the corresponding pages and the images of the corresponding image areas are identical. In addition, the image comparison function 270 is a function of comparing an image determined to be not identical with individual objects drawn in the corresponding image areas of the corresponding pages of the target document and the comparative documents. Specifically, the image comparison function 270 determines a difference in a type, a position, a size, or the like of the object.

In a case where the type of the object is determined, a degree of the determination is individually decided according to a specification and a usage purpose of the document processing server 200, a type of a document which is a difference detection target, or the like. For example, in a case where a structure is distinguished between a building and a detached house or in a case where it is necessary to distinguish that types of buildings are different, determination of different degrees is required. In addition, the determination of the type of object is also affected by recognition performance of the image recognition function 250. In a case where the recognition performance is improved, it is possible to distinguish the type of the object in more detail.

The position of the object is specified using, for example, coordinates set on the page or the image area. As a specific example, in a case where coordinates of a reference position of the image area (for example, an upper left position of the image area) are set as an origin (0, 0), the position of each object may be specified using a coordinate value of the reference position of each object (for example, an upper left position of the object) in the image area.

The size of the object is specified by a distance between the above-described reference position of the object and a feature point specified according to a shape of the object. In addition, the shape of the object may be specified based on a positional relationship between the reference position of the object and the feature point. The feature point according to the shape of the object may be specified by using various existing algorithms.

The document difference decision function 280 is a function of performing decision of the difference between the documents based on a result of the comparison performed by the image comparison function 270 and a decision rule of the difference between the documents. The decision rule is prepared according to the type of the document which is a difference decision target. That is, in a case where a difference between different types of documents is decided, there is a case where different decision rules are used. Details of the decision rule will be described later.

The decision rule generation function 281 is a function of generating the decision rule used for the decision of the difference between the documents by the document difference decision function 280. The decision rule generation function 281 generates a setting screen which is a user interface for setting the decision rule, sends the generated setting screen to the terminal device 300 of the user, and displays the setting screen on the display device of the terminal device 300. Further, a setting operation performed on the setting screen by the user is accepted, and the decision rule associated with the type of the document is generated. In a case where the corresponding document is the decision target, the generated decision rule is referred to by the document difference decision function 280.

The output function 290 is a function of outputting a decision result obtained by the document difference decision function 280. In the exemplary embodiment, according to the decision rule, even in a case where the images of the corresponding pages of the target document and the comparative documents and the images of the image areas are different, there is a case where the documents are decided as the identical documents having no difference based on the images. In this case, the output function 290 outputs information on a difference between the images in the plurality of documents decided to be the identical documents in the decision result. As an example of a decision result output method, the output function 290 generates a decision result presentation screen showing the decision result, sends the generated decision result presentation screen to the terminal device 300 of the user, and displays the decision result presentation screen on the display device of the terminal device 300. The output function 290 may perform display of indicating the difference between the corresponding images of the target document and the comparative documents on the decision result presentation screen. Details of the decision result presentation screen will be described later.

Example of Decision Rule

The decision rule used for the decision by the document difference decision function 280 will be further described. The decision rule is a rule that defines a granularity of detecting a change in the image of the image area in the document as a change in the document. In other words, the decision rule defines a degree of the difference between the images in a case where, even though the difference between the images of the image areas exist, the difference is not considered as the difference between the documents (decided to be identical). For example, the following decision rule may be considered. Here, it is assumed that the decision rule is applied to each object displayed in the image area.

(Decision rule 1) In a case where the types of the objects match, it is decided to be identical.

(Decision rule 2) In a case where the types and relative positional relationships of the objects match, it is decided to be identical.

(Decision rule 3) In a case where the types and sizes of the objects match, it is decided to be identical.

As a decision example according to the decision rules, first, in a case where the types of the objects corresponding to each other drawn in the image areas corresponding to each other in the plurality of documents are different even though any of the decision rules 1, 2, and 3 are applied, the document difference decision function 280 determines that the objects are not identical and decides as the difference between the target document and the comparative document. Further, in a case where the decision rule 1 is applied, the types of the objects corresponding to each other match and the positions and sizes of the objects are different, the document difference decision function 280 determines that the objects are identical and does not decide as the difference between the target document and the comparative document.

In addition, in a case where the decision rule 2 is applied, the types of the objects corresponding to each other match, and the relative positional relationships of the objects are different, the document difference decision function 280 determines that the objects are not identical and decides as the difference between the target document and the comparative document. On the other hand, in a case where the types of the objects corresponding to each other match, the relative positional relationships of the objects match, and the sizes of the objects are different, the document difference decision function 280 determines that the objects are identical and does not decide as the difference between the target document and the comparative document.

In addition, in a case where the decision rule 3 is applied, the types of the objects corresponding to each other match, and the sizes of the objects are different, the document difference decision function 280 determines that the objects are not identical and decides as the difference between the target document and the comparative document. On the other hand, in a case where the types of the objects corresponding to each other match, the sizes of the objects match, and the positional relationships of the objects corresponding to each other are different, the document difference decision function 280 determines that the objects are identical and does not decide as the difference between the target document and the comparative document.

The document difference decision function 280 applies the decision rule associated with the type of the document according to the type of document to be processed and decides the difference between the documents. An example of the type of the document includes a contract, a receipt, a procedure, an instructional material, or the like. For example, a case is taken into consideration where the document to be processed is an explanatory material of a building property and image areas displaying floor plans exist in the document. Generally, in a case where any of the types and the positional relationships of the objects are different in the floor plans, the floor plans are recognized as different figures. On the other hand, in a case where the types and positional relationships of the objects are identical, the floor plans are recognized as identical figures even though the display sizes are different. Here, in the case of the document, decision performed by applying the above-described decision rule 2 may be considered.

Configuration of Terminal Device 300

FIG. 4 is a diagram showing an example of a configuration of the terminal device 300. The terminal device 300 includes a control unit 310, a display unit 320, and an input unit 330. The terminal device 300 is realized by, for example, an information processing apparatus such as a personal computer. The configuration shown in FIG. 4 is merely an example, and the configuration of the terminal device 300 is not limited to the shown configuration. For example, a storage device that holds various data used for the process and the processing result, and a peripheral device that realizes various functions controlled by the control unit 310 may be included.

The control unit 310 is a device that controls the terminal device 300, and includes a CPU 311, a RAM 312, and a ROM 313. The RAM 312 is a main storage device, and is used as a work memory in a case where the CPU 311 performs an arithmetic process. The ROM 313 holds a program and data such as a set value that is prepared in advance, and the CPU 311 reads the program and the data from the ROM 313 and executes the process.

The display unit 320 is a device that displays a screen such as an operation screen or an information presentation screen. The display unit 320 displays the decision result presentation screen that presents a decision result of the difference between the documents by the document processing server 200, a user interface screen for generating a new decision rule, or the like. For example, a liquid crystal display or the like is used as the display unit 320.

The input unit 330 is a device that receives an input operation by the user. The input unit 330 receives an operation performed by the user according to an operation screen, such as a user interface screen, displayed on the display unit 320. For example, a device, such as a keyboard or a mouse, is used as the input unit 330. In addition, a touch sensor may be used as the input unit 330, and a touch panel may be configured as the user interface through a combination with the liquid crystal display that is the display unit 320.

Operation of Document Processing Server 200

FIG. 5 is a flowchart showing an operation of the document processing server 200. Note that, hereinafter, it is assumed that the target document is generated from the comparative document, and an operation of deciding the difference between the generated target document and the original comparative document will be described. Note that, in the following description, decision of the difference based on images displayed in the image areas will be described, and the difference based on the text areas will not be described. For the difference based on the text areas, for example, an existing method of reading texts from the text areas and comparing contents of the read texts is applied.

In a case where the document processing server 200 receives designation of the target document and the comparative document (S501), the document processing server 200 acquires the designated documents from the document management server 100 and reads pieces of information on the documents managed by the document information management function 210 (S502). Further, the document processing server 200 specifies the decision rule according to the type of the target document by the document processing control function 220, the image comparison function 270, and the document difference decision function 280 (S503), and executes the document analysis process (S504).

Next, the document processing server 200 decides the difference between the target document and the comparative document based on a result of the document analysis process by the image comparison function 270 and the document difference decision function 280. In a case where it is decided that the difference exists (YES in S505), the document processing server 200 acquires information on difference by the document difference decision function 280 (S506), and outputs a decision result including the acquired information on difference by the output function 290 (S507).

On the other hand, in a case where it is decided that no difference exists between the documents (NO in S505), the document processing server 200 decides whether or not a difference exists between the images of the image areas in the target document and the comparative document based on the result of the document analysis process by the image comparison function 270 and the document difference decision function 280. In a case where it is decided that the difference exists (YES in S508), the document processing server 200 acquires information on difference by the document difference decision function 280 (S509), and outputs a decision result indicating that no difference exists between the documents, together with the information on difference acquired by the output function 290 (S510).

On the other hand, in a case where it is decided that no difference exists between the images of the image areas (NO in S508), the document processing server 200 outputs the decision result indicating that no difference exists between the documents by the output function 290 (S511). Therefore, the decision result output from the document processing server 200 is any of three types including the decision result indicating that the difference exists between the documents, the decision result including the information on difference of the images and indicating that no difference exists between the documents, and the decision result including no information on difference of the images and indicating that no difference exists between the documents.

FIG. 6 is a flowchart showing content of the document analysis process (S504) shown in FIG. 5. The document analysis process is executed as a subroutine of a major process described with reference to FIG. 5, and the following processes are executed for all pages of the target document (S601). Under the control of the document processing control function 220, the document processing server 200 specifies one page in the target document as a processing target page (hereinafter, referred to as a "target page"), and executes analysis of the target page using the conversion function 230, the area separation function 240, the image recognition function 250, and the text extraction function 260 (S602). With the analysis, the target page is imaged, the imaged target page is separated into the image area and the text area, the image area obtained through the separation is image-recognized, and text is extracted from the text area. In addition, each page of the comparative document is also imaged. Further, the document processing server 200 compares the target page with each page of the comparative document by the image comparison function 270 and the document difference decision function 280, and executes a page decision process of deciding whether or not a page (hereinafter, referred to as a "matching page") regarded as having identical content with the target page exists (S603).

In a case where it is decided that no matching page for the target page exists as a result of the page decision process (NO in S604), the document processing server 200 sets the target page as a new page by the document difference decision function 280 (S605). On the other hand, in a case where it is decided that the matching page for the target page exists as the result of the page decision process (YES in S604), the document processing server 200 decides whether or not the information on the difference between the corresponding images exists in the target page and the matching page by the image comparison function 270. In a case where the information on difference between the images does not exist (NO in S606), the document processing server 200 sets the target page as a non-updated page by the document difference decision function 280 (S607). In a case where the information on the difference between the images exists (YES in S606), the document processing server 200 sets the target page as an updated page by the document difference decision function 280 (S608).

After the processes in S602 to S608 are performed on all pages of the target document, the document processing server 200 decides whether or not the comparative document includes a page that does not correspond to any of pages of the target document by the document difference decision function 280. In a case where the page exists (YES in S609), the document processing server 200 sets the page of the comparative document as a page deleted in the target document by the document difference decision function 280 (S610). Further, the document processing server 200 returns the setting information on each page of the target document and the information on the difference between the images to the major process as an analysis result by the document difference decision function 280 (S611). On the other hand, in a case where the comparative document does not include the page which does not correspond to any of pages of the target document (NO in S609), the document processing server 200 returns the setting information on each of the pages of the target document and the information on the difference between the images to the major process as the analysis result by the document difference decision function 280 (S611).

FIG. 7 is a flowchart showing content of the page decision process (S603) shown in FIG. 6. In the page decision process, the following processes are executed for all pages of the target document as a part of the document analysis process described with reference to FIG. 6 (S701). The document processing server 200 compares the image of the target page specified in S602 of FIG. 6 with the image of each of the pages of the comparative document by the image comparison function 270 (hereinafter, an image of a whole page is referred to as a "page image"). In a case where the page image of the target page matches the page image of the page (hereinafter, referred to as a "focused page") of the comparative document focused as a comparison target (YES in S702), the document processing server 200 sets the focused page as the matching page by the document difference decision function 280 (S707).

On the other hand, in a case where the page image of the target page does not match a page image of the focused page (NO in S702), the document processing server 200 executes analysis of the focused page using the conversion function 230, the area separation function 240, the image recognition function 250, and the text extraction function 260 under the control of the document processing control function 220 (S703). With the analysis, the focused page is separated into the image area and the text area, the image area obtained through the separation is image-recognized, and text is extracted from the text area. Further, the document processing server 200 executes a page comparison process for the target page and the focused page by the document processing control function 220, the image comparison function 270, and the document difference decision function 280 (S704).

Next, the document processing server 200 decides a difference between the target page and the focused page based on a result of the page comparison process by the image comparison function 270 and the document difference decision function 280. In a case where it is decided that no difference exists (NO in S705), a difference exists between the images displayed in the image areas of the pages, and thus the document processing server 200 acquires information on a difference between the image areas included in the target page and the focused page by the document difference decision function 280 (S706), and sets the focused page as the matching page (S707).

In contrast, in a case where it is decided that the difference exists between the target page and the focused page (YES in S705), the focused page is not set as the matching page for the target page. In a case where the document processing server 200 performs the page decision process on all pages of the target document, the page decision process ends and the process proceeds to S604 in FIG. 6. Note that, the page, which is not set as the matching page, of the comparative document for all pages of the target document, is set as the deleted page in S610 of FIG. 6.

FIG. 8 is a flowchart showing content of the page comparison process (S704) shown in FIG. 7. The page comparison process is executed as a subroutine of the page decision process described with reference to FIG. 7, and the following processes are executed for all image areas included in the target page (S801). Under the control of the document processing control function 220, the document processing server 200 specifies one image area in the target page as an image area to be processed (hereinafter, referred to as "target image area"), and executes the image recognition process using the image recognition function 250 (S802). With the image recognition process, information, such as a type, a position, or a size related to an object displayed in the target image area, is acquired. Further, the document processing server 200 compares the target image area with the image area of the focused page (see FIG. 7) of the comparative document by the image comparison function 270, and executes an area decision process of deciding whether or not an image area (hereinafter, referred to as "matching area") considered to have identical content to the target image area exists (S803).

In a case where it is decided that no matching area for the target image area exists as a result of the area decision process (NO in S804), the document processing server 200 sets the target image area as a new area by the image comparison function 270 (S805). On the other hand, in a case where it is decided that the matching area for the target image area exists as the result of the area decision process (YES in S804), the document processing server 200 decides whether or not information on difference between corresponding objects displayed in the target image area and the matching area exists by the image comparison function 270. In a case where the information on the difference between the objects does not exist (NO in S806), the document processing server 200 sets the target image area as a non-updated area by the image comparison function 270 (S807). Further, in a case where the information on the difference between the objects exists (YES in S806), the document processing server 200 sets the target image area as an updated area by the image comparison function 270 (S808).

After the processes in S802 to S808 are performed on all image areas of the target page, the document processing server 200 decides whether or not the focused page includes an image area, which does not correspond to any of the image areas of the target page, by the image comparison function 270. In a case where the image area exists (YES in S809), the document processing server 200 sets the area of the focused page as a deleted image area in the target page by the image comparison function 270 (S810). Further, the document processing server 200 returns the setting information on each of the image areas of the target page and the information on the difference between the objects to the page decision process as the analysis result by the image comparison function 270 (S811). On the other hand, in a case where the image area, which does not correspond to any of the image areas of the target page, of the focused page does not exist (NO in S809), the document processing server 200 returns the setting information on each of the image areas of the target page and the information on the difference between the objects to the page decision process as the analysis result by the image comparison function 270 (S811).

FIG. 9 is a flowchart showing content of the area decision process (S803) shown in FIG. 8. In the area decision process, the following processes are executed for all image areas of the target page as a part of the page comparison process described with reference to FIG. 8 (S901). Under the control of the document processing control function 220, the document processing server 200 executes the image recognition process for the image areas of the focused page using the image recognition function 250 (S902). With the image recognition process, information, such as a type, a position, or a size related to an object displayed in the image area, is acquired. Note that, the image recognition process may be performed only in an operation for an initial target page, and the information on the object obtained through the image recognition process may be held in, for example, the storage device 104 shown in FIG. 2 and may be used in an operation for another target pages.

Next, the document processing server 200 compares the object displayed in the target image area with the object displayed in the image area of the focused page by the image comparison function 270. Here, regarding the comparison of the objects, the decision rule specified in S503 of FIG. 5 is used. Therefore, content of the comparison of the objects differs according to the type of the target document. In an operational example shown in FIG. 9, it is assumed that the above-described decision rule 1 "in a case where the types of the objects match, it is decided to be identical" is used. Therefore, in the operational example, it is only decided whether or not the types of the objects match.

In a case where the type of the object displayed in the target image area matches the type of the object displayed in the image area focused as the comparison target (hereinafter, referred to as "focused area") in the focused page (YES in S903), the document processing server 200 sets the focused area as the matching area by the image comparison function 270 (S904). On the other hand, in a case where the type of object displayed in the target image area does not match the type of object displayed in the focused area (NO in S903), the focused area is not set as the matching area. In a case where the document processing server 200 compares all image areas of the target page with the image area of the focused page, the area decision process for the target page ends, and the process proceeds to S804 of FIG. 8. Note that, the image area of the focused page, which is not set as the matching area for all image areas of the target page, is set as the deleted image area in S810 of FIG. 8.

FIG. 10 is a flowchart showing another example of the area decision process (S803) shown in FIG. 8. An operational example shown in FIG. 10 is different from the operational example shown in FIG. 9 in content of the comparison between the object displayed in the target image area and the object displayed in the image area of the focused page. Therefore, S1001 and 51002 of FIG. 10 are the same as S901 and S902 of FIG. 9. Here, in the comparison of the objects, the above-described decision rule 2 "in a case where the types of the objects and the relative positional relationships match, it is decided to be identical" is used. Therefore, in the operational example, it is decided whether or not the types of objects match and whether or not the positions of the objects match.

In a case where the type of the object displayed in the target image area matches the type of the object displayed in the focused area (YES in S1003) and the relative positional relationships of the objects having matching types match (YES in S1004), the document processing server 200 sets the focused area as the matching area by the image comparison function 270 (S1005). In contrast, in a case where the types of the objects do not match (NO in S1003) and in a case where the types of the objects match but the relative positional relationships of the objects having the matching types do not match (YES in S1003 and NO in S1004), the focused area is not set as the matching area. In a case where the document processing server 200 compares all image areas of the target page with the image area of the focused page, the area decision process for the target page ends, and the process proceeds to S804 of FIG. 8. Further, the image area, which is not set as the matching area, of the focused page for all image areas of the target page is set as the deleted image area in S810 of FIG. 8.

Example of Decision of Image Area

FIG. 11 is a diagram showing an example of a configuration of a decision rule setting screen used for the decision of the difference between the image areas. As described with reference to FIG. 3, it is possible to prepare the decision rule according to the type of document to be processed, and a new decision rule may be generated by the decision rule generation function 281 of the document processing server 200. In a case where the decision rule is generated, for example, the setting screen controlled by the decision rule generation function 281 is transmitted to the terminal device 300 to be displayed on the display unit 320, and the operation by the user is received.

A setting screen 410 shown in FIG. 11 includes a document type setting field 411 and a rule setting field 412. In the document type setting field 411, information specifying the type of document which is an application target of the decision rule to be generated is set. In the example shown in FIG. 11, a list of the types of the documents that may be set is presented in the document type setting field 411. In the drawing, four types including a "contract", a "receipt", a "property layout", and a "presentation material" are presented. In addition, radio buttons are displayed for respective items, and it is possible to select one of four types of documents.

In the rule setting field 412, information specifying content of the decision rule to be applied is set. In the example shown in FIG. 11, selectable rules are listed and check boxes are displayed for the respective rules. In a case where the user checks the check box, it is possible to select the decision rule to be applied to the document of the type specified in the document type setting field 411.

The document processing server 200 generates the decision rule based on the information set by an operation performed on the document type setting field 411 and the rule setting field 412 by the decision rule generation function 281. The generated decision rule is applied to decide the difference between the target document of the type selected in the document type setting field 411 and the comparative document in the decision using the document difference decision function 280.

Figure 12A:
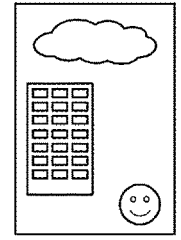
Figure 12B:
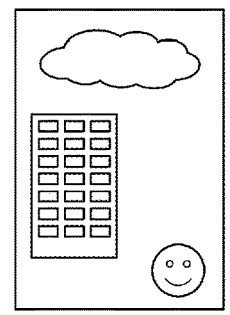
Figure 12C:
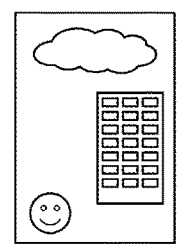
Figure 12D:
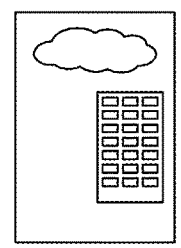

FIGS. 12A to 12D are diagrams showing examples of the target document and the comparative documents. FIG. 12A is a diagram showing an example of the target document, FIG. 12B is a diagram showing an example of the comparative document for the target document of FIG. 12A, FIG. 12C is a diagram showing another example of the comparative document for the target document of FIG. 12A, and FIG. 12D is a diagram showing another example of the comparative document for the target document of FIG. 12A. Each document shown in FIGS. 12A to 12D includes the text area in which a title is described, the text area in which a description of a figure is described, and the image area in which an image is described.

In a case where the target document in FIG. 12A is compared with the comparative document 1 in FIG. 12B, the two text areas match, images in the image areas have identical types ("cloud", "building", and "face") of the objects and identical relative positional relationship, but the sizes of the image areas are different. In a case where the document processing server 200 decides the difference between the documents and the above-described decision rule 1 "in a case where the types of the objects match, it is decided to be identical" is used, it is decided that the two documents match and no difference exists between the documents. Further, the information on the difference between the image areas, which indicates that the sizes of the image areas are different is acquired. Similarly, in a case where the above-described decision rule 2 "in a case where the types of the objects and the relative positional relationships match, it is decided to be identical" is applied, it is decided that the two documents match and no difference exists between the documents, and thus the information on the difference between the image areas, which indicates that the sizes of the image areas are different is acquired. In contrast, in a case where the above-described decision rule 3 "in a case where the types and the sizes of the objects match, it is decided to be identical" is applied, the two documents are decided to have a difference, and the information on the difference between the image areas, which indicates that the sizes of the image areas are different is acquired.

In a case where the target document in FIG. 12A is compared with the comparative document 2 in FIG. 12C, the two text areas match and the sizes of the image areas are identical. In addition, although the types of the objects are identical in the images of the image areas, the relative positions of some objects ("building" and "face") are different. In a case where the document processing server 200 decides the difference between the documents and the above-described decision rule 1 "in a case where the types of the objects match, it is decided to be identical" is used, it is decided that the two documents match and no difference exists between the documents. Further, the information on the difference between the image areas, which indicates that the positions of the objects are different, is acquired. In contrast, in a case where the above-described decision rule 2 "in a case where the types of the objects and the relative positional relationships match, it is decided to be identical" is applied, it is decided that the difference exists between the two documents, and the information on the difference between the image areas, which indicates that the positions of the objects are different, is acquired. In addition, in a case where the above-described decision rule 3 "in a case where the types and the sizes of the objects match, it is decided to be identical" is applied, it is decided that the two documents match and no difference exists between the documents, and the information on the difference between the image areas, which indicates that the positions of the objects are different, is acquired.

In a case where the target document in FIG. 12A is compared with a comparative document 3 in FIG. 12D, the text areas of the titles match and the texts of the text areas for description of the figure description are different. Further, the images displayed in the image areas are different. In a case where the document processing server 200 decides the difference between the documents, it is decided that the difference exists between the two documents regardless of which of the decision rules 1, 2, and 3 is applied. Further, the information on the difference between the image areas is acquired, the information on the difference between the image areas indicating that the object ("face") which is not displayed in the image area of the comparative document 3 is displayed in the image area of the target document and that one ("building") of the same types of objects displayed in the image areas of both the documents has a different relative positional relationship in the image area.

FIG. 13 is a diagram showing a display example of the decision result presentation screen. A decision result presentation screen 420 shown in FIG. 13 includes a page configuration presentation field 421, a page display field 422, and a deleted page presentation field 423. In the example shown in FIG. 13, an aspect is shown in which a certain document is updated and the difference is decided by setting a document obtained after the update as the target document and a document obtained before the update as the comparative document. In addition, it is assumed that the decision of the difference is performed by applying the decision rule 1 "in a case where the types of the objects match, it is decided to be identical".

The page configuration presentation field 421 displays a page configuration of the target document and the decision result of each page. The page configuration of the target document is shown by displaying page numbers in a row, and the decision result of each page is shown by displaying text indicating the decision result for each page number. The example shown in FIG. 13 shows that the target document is configured with four pages, a first page and a fourth page have no difference with the comparative document (in the drawing, described as "non-change"), a second page is a page newly added to the target document (in the drawing, described as "addition"), and a third page is a page whose content is changed from a corresponding page of the comparative document (in the drawing, "content is changed"). In addition, the example shown in FIG. 13 shows that a page number of the first page is highlighted and the first page is displayed in the page display field 422.

An image of a page selected by the user in the target document is displayed in the page display field 422. In the example shown in FIG. 13, the image of the first page highlighted in the page configuration presentation field 421 is displayed. Here, it is assumed that the image of the first page of the target document is the image of the target document shown in FIG. 12A. Further, it is assumed that the image of the first page of the comparative document is the image of the comparative document 1 shown in FIG. 12B.

Here, the image displayed in the page display field 422 is displayed to show the difference between the target document and the comparative document. In the example shown in FIG. 13, the difference between the target document in FIG. 12A and the comparative document 1 in FIG. 12B is shown. Regarding the documents, as described with reference to FIGS. 12A and 12B, the types and the relative positional relationships of objects displayed in the image area are identical but the sizes of the image areas are different. Therefore, in the first page of the target document displayed in the page display field 422 of FIG. 13, an area 422b corresponding to the image area of the comparative document 1 is displayed (displayed with a broken line in the drawing) to overlap the image area 422a of the target document) so that it is possible to visually recognize how the image area of the target document is changed for the comparative document 1.

In addition, considering the display of the page configuration presentation field 421 and the display of the page display field 422, the content of the image area of the target document is different from the content of the image area of the comparative document according to the display of the page display field 422 but the documents are set as "nonchange" according to the display of the page configuration presentation field 421. Here, since the decision rule 1 is used to decide the difference as described above, it is determined that the document is set as non-change even though the displays of the image areas are changed as described above.

In the deleted page presentation field 423, information is displayed, the information indicating that the page of the comparative document corresponding to the target page does not exist. In the example, the page shown in the deleted page presentation field 423 means that the page is deleted through updating. In the example shown in FIG. 13, the corresponding page does not exist, and information on the page is not displayed in the deleted page presentation field 423. Therefore, it is shown that a page deleted from a cited document does not exist in the update to the target document.

FIG. 14 is a diagram showing another display example of the decision result presentation screen. In the example, it is assumed that the image of the first page of the comparative document before updating is the image of the comparative document 2 shown in FIG. 12C. In the example shown in FIG. 14, the display contents of the display fields 421, 422, and 423 are identical to the example shown in FIG. 13. However, since the comparative document before updating is different, the display showing the difference between the target document and the comparative document in the image of the first page displayed in the page display field 422 differs from the example shown in FIG. 13.

In the example shown in FIG. 14, the difference between the target document of FIG. 12A and the comparative document 2 of FIG. 12C is shown. Regarding the documents, as described with reference to FIGS. 12A and 12C, the size of the image area and the type of objects displayed in the image area are identical but the relative positions of some objects are different. Therefore, in the first page of the target document displayed in the page display field 422 of FIG. 14, an arrow 422c indicating movement of the objects ("building" and "face") whose positions are changed in the image area 422a of the target document is displayed so that it is possible to visually recognize a change in the image area of the target document for the comparative document 2. The arrow is displayed, for example, by using a position (for example, the reference position) of a specific point of the moved object and using a reference position of the object in the image area of the comparative document as a start point and a reference position of the object in the image area of the target document as an end point.

FIG. 15 is a diagram showing an example of analysis information obtained by the document processing server 200 analyzing the page images of the target document and the comparative document. In the analysis information shown in FIG. 15, pieces of information including a "document name", a "page number", "positional information", an "area type", and "area content" are recorded. The "document name" is a file name of a document including the page shown in the page image. The "page number" is a page number of the page shown in the page image. The "positional information" is information indicating a position of each of the areas (the image area and the text area), which are obtained through the separation performed by the area separation function 240 of the document processing server 200, in the page image. Here, it is assumed that each of all the areas is set as a rectangle (including a square), and the information indicating a position of each vertex of the rectangular area by a coordinate value in a coordinate system set in the page image is described. In the "area type", information indicating whether the area separated from the page image is the image area or the text area is recorded. In a case of the image area, "image" is recorded, and, in a case of the text area, "text" is recorded. In the "area content", information indicating content of each of the areas is recorded. In the "area content" of the image area, information on an object extracted from the image area is recorded, and, in the "area content" of the text area, text described in the text area is recorded.

The coordinate system and expression of the coordinate value set in the page image will be further described. The page image is the rectangle, and the coordinate system set for the page image is set as an orthogonal coordinates in which an upper left corner is set as the origin (0, 0), a horizontal axis extending in a right direction is set as an x axis, and a vertical axis extending in a downward direction is set as a y axis. In addition, the y axis indicates a distance from the origin with a negative value. In the coordinate system, the rectangular area (the image area and the text area) is shown by an element string [x1, y1, x2, y2] representing the coordinate value of each vertex. In a case where four vertices exist in the rectangular area and the element string is used, setting is performed such that a coordinate value [x1, y1] is an upper left vertex, a coordinate value [x2, y1] is an upper right vertex, a coordinate value [x1, y2] is a lower left vertex, and a coordinate value [x2, y2] is a lower right vertex. For example, a position of an area shown in a first line of FIG. 15 is indicated by positional information [20, −20, 60, −40]. Therefore, in the area, the position of the upper left vertex is a position of a coordinate value [20, −20], the position of the upper right vertex is a position of a coordinate value [60, −20], the position of the lower left vertex is a position of a coordinate value [20, −40], and the position of the lower right vertex is a position of a coordinate value [60, −40].

In addition, the position of the object displayed in the image area (the area type "image") is indicated by a reference position of each object for the reference position of the image area. The reference position of the image area is the position of the upper left vertex of the image area which is the rectangular area. The reference position of the object is, for example, the position of the upper left vertex of the rectangle (including a square) that involves the object and includes sides parallel to respective sides of the image area. The reference position of each object for the reference position of the image area is indicated by the coordinate value in the coordinate system set for the image area. The coordinate system is set as the orthogonal coordinates in which the reference position of the image area is set as the origin (0, 0), the horizontal axis extending in the right direction is set as the x axis, and the vertical axis extending in the downward direction is set as the y axis. In addition, the y axis indicates a distance from the origin with a negative value.

The information on the object displayed in the image area shown in FIG. 15 is indicated by the element string [a type, an x coordinate value, a y coordinate value]. The "type" is information indicating the type of the object specified by the image recognition function 250 of the document processing server 200. The "x coordinate value" and the "y coordinate value" are the x coordinate value and the y coordinate value in the coordinate system set for the image area. For example, in an object [cloud, 10, −10], which is one of three objects shown in the "area content" of an image area on a third line of FIG. 15, has the object type "cloud", the type of the object is "cloud" and the position of the object is indicated by a coordinate value [10, −10] in the coordinate system set in the image area.

Therefore, the following content is read from the example of the analysis information shown in FIG. 15. First, FIG. 15 shows that first to third pages of a document having a file name "sample.ppt" are recorded, and two text areas and one image area exist in each page. Referring to the first page and the second page, the content of the two text areas "title" and "description of figure: a cloud, a person, and a building are captured" are identical. In addition, although the sizes of the image areas are identical and the types of the objects displayed in the image area and the positions in the image areas are identical, the positions of the image areas (refer to the element string of the "positional information") on the pages are different. On the other hand, referring to the first page and the third page, although the content "title" of one text area is identical, content of the other text area is "description of figure: a cloud and a building are captured", and thus the contents are different. In addition, the position of the image areas and the sizes of the image areas in the pages are identical. Further, among the objects displayed in the image areas, the positions of the "cloud" are identical and positions of the "building" are different. In addition, the object "person" displayed in the image area of the first page is not displayed in the third page.

Hereinabove, although the exemplary embodiment of the present invention has been described, the technical scope of the present invention is not limited to the above exemplary embodiment. For example, in the above exemplary embodiment, although the relationship between the difference between the image areas of the plurality of documents obtained as the result of the image recognition process of the image area and the decision of the difference between the documents has been described, content of the text obtained from the text area may be referred to and may be reflected in the decision of the difference between the documents. In addition, all of the configuration of the decision rule setting screen shown in FIG. 11, the configuration of the decision result presentation screen shown in FIGS. 13 and 14, and the analysis information shown in FIG. 15 are only examples, and are not limited to the configurations shown in the drawings. In addition, various changes and substitutions of configurations that do not depart from the scope of the technical idea of the present invention are included in the present invention.

The foregoing description of the Exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A document processing apparatus, comprising:
a processor configured to
extract an image area, in which an image is disposed, from a plurality of documents to be processed,
perform an image recognition process on the image area,
compare information on the image of the image area for each document, the information being obtained by performing the image recognition process, and
decide a difference for the documents based on a result of comparison of the information on the image and a decision rule for the documents, wherein the decision rule defines a basis for deciding the difference between the information of the image from the documents being type, size, or position of an object drawn in the image area.

2. The document processing apparatus according to claim 1,
wherein the process is configured to
extract the object drawn in the image area through the image recognition process, and
perform the comparison for each object extracted from the image area for each document.

3. The document processing apparatus according to claim 2,
wherein the processor is configured to decide a difference between the types of the objects corresponding to each other drawn in the image areas corresponding to each other in the plurality of documents as the difference between the documents.

4. The document processing apparatus according to claim 3,
wherein the processor is configured not to apply a difference between the positions of the objects corresponding to each other in the image areas corresponding to each other in the plurality of documents to decision of the difference between the documents.

5. The document processing apparatus according to claim 3,
wherein the processor is configured not to apply a difference between size sizes of the objects corresponding to each other in the image areas corresponding to each other in the plurality of documents to decision of the difference between the documents.

6. The document processing apparatus according to claim 1,
wherein the processor is configured to output information on a difference between the images in the plurality of documents decided to have no difference based on the images of the image areas.

7. The document processing apparatus according to claim 6,
wherein the processor is configured to add, to a screen displaying an image of an image area of one of the plurality of documents decided to have no difference based on the images of the image areas, a display indicating a difference from an image of a corresponding image area in another document among the plurality of documents.

8. The document processing apparatus according to claim 1,
wherein the processor is configured to decide the difference for the documents by applying the decision rule associated with types of the documents according to the types of the documents to be processed.

9. The document processing apparatus according to claim 8,
wherein the processor is configured to
display a user interface screen for setting the decision rule on a display device, and
receive a setting operation performed by a user and generates the decision rule associated with the types of the documents.

10. A non-transitory computer readable medium storing a program causing a computer to execute a process, the process comprising:
extracting image an area, in which an image is disposed, from a plurality of documents to be processed;
performing an image recognition process on the image area;
comparing information on the image of the image area for each document, the information being obtained through the image recognition process; and
deciding a difference for the documents based on a result of comparison of the information on the image and a decision rule for the documents, wherein the decision rule defines a basis for deciding the difference between the information of the image from the documents being type, size, or position of an object drawn in the image area.

* * * * *